2,799,623
Patented July 16, 1957

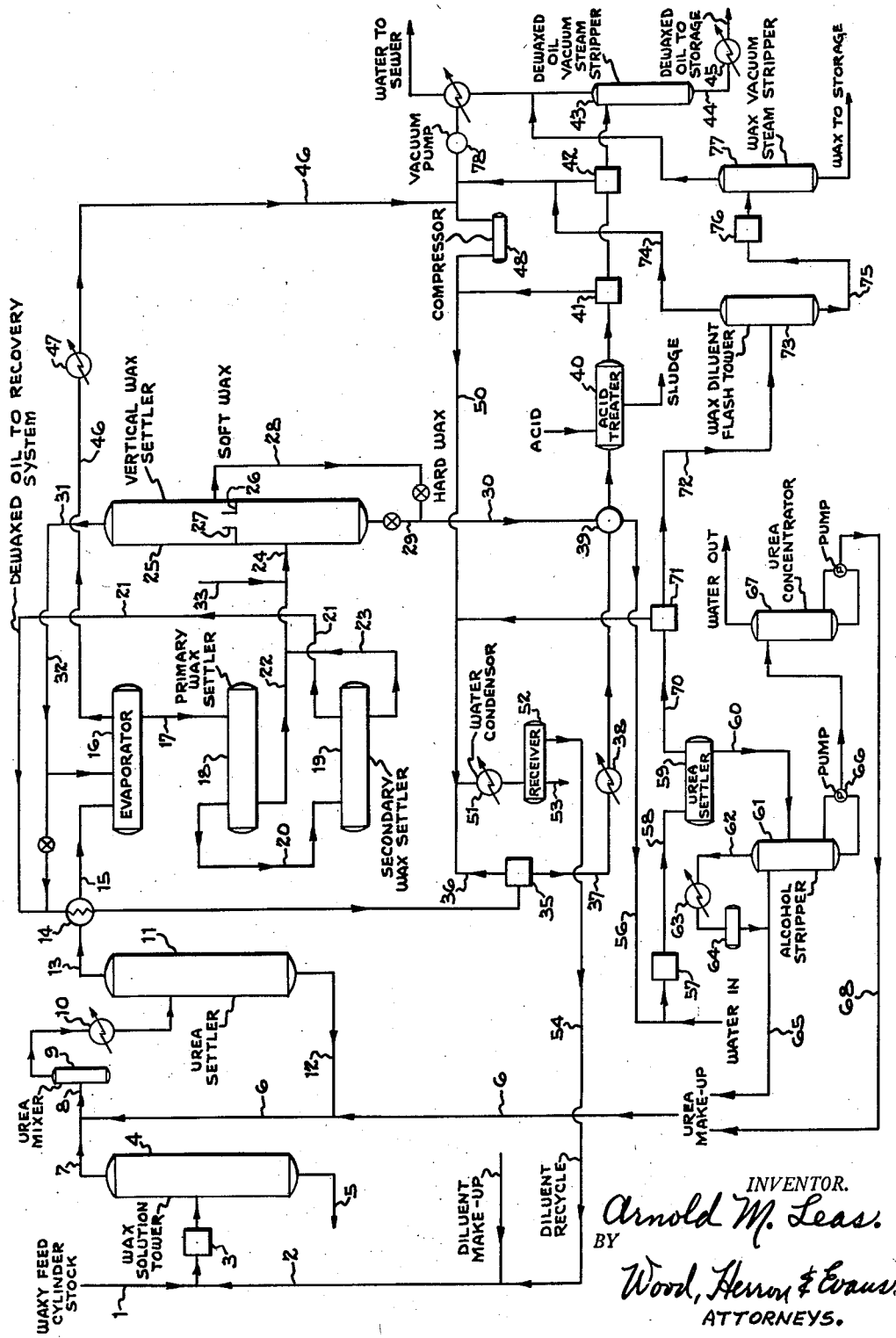

2,799,623
PROCESS FOR SEPARATING WAXES FROM OIL

Arnold M. Leas, Ashland, Ky., assignor to Ashland Oil & Refining Company, Ashland, Ky., a corporation of Kentucky Application July 16, 1953, Serial No. 368,386

7 Claims. (Cl. 196—18)

This invention relates to the separation of wax from mineral oil. It is directed particularly to a process for removing wax from cylinder stocks, distillates, raffinates and similar waxy hydrocarbons, such that the pour test thereof may be lowered and the lubricating qualities improved. The invention is also directed to an oil dewaxing process wherein separate waxy residues of different quality and melting point may be produced, such that yields of waxes having greater saleability are obtained at the same time that the quality of the parent oil is improved.

The principal objective of the present invention has been to provide a simple process which is capable of effecting substantially complete removal of all wax compounds found in various types of crude oils, including waxes of a readily crystallizable nature, as well as petrolatum and amorphous and microcrystalline waxes or ceresins. A further objective of the present invention has been to provide an effective process of this nature which, for its use, does not require filtering or centrifuging apparatus but which is capable of causing wax precipitation and sedimentation of components in layer formation from which the component layers may be removed conveniently by decantation. This invention also contemplates a method which may be conducted at a rapid rate.

Wax compounds present in mineral oils are in a dissolved or colloidally dispersed state at relatively high temperatures, but become gelatinous or crystalline at very low temperatures. This characteristic has formed the basis of dewaxing processes heretofore employed in which the oil was held at low temperature, with or without a diluent, for a prolonged period of time sufficient for the solid or semi-solid particles of wax to separate by gravity. It has also previously been known that the wax which is contained in a waxy oil may be caused to solidify or crystallize by chilling the oil to a sufficiently low temperature, and that the wax may be separated from the oil by pressure filtration or centrifuging. However, because of the exceedingly fine state of some of the particles, even though of solid condition, and because of the viscous nature and related specific gravity of the oil even when diluted, the fine particles tended to remain as a dispersed phase, and as a result, only a portion of the wax could be separated by such procedures. The precipitated wax crystals either clog a filter or escape the filter and remain in the oil if excessive filter pressure is exerted. It is also known that the filterability of a chilled wax-bearing oil is improved by the addition of an inert solvent or diluent, but even then, the precipitated wax is very difficult to remove because of its slimy qualities, and the filtration equipment which is required for the process is very expensive.

This invention, briefly, is based upon the discovery and determination that a small percentage of urea, when incorporated in a wax-bearing oil which is diluted with an inert solvent, is capable of inducing the formation of large wax crystals when the oil is refrigerated to a low temperature, and that the wax crystals form a distinct, separate and separable layer of suspended wax. Dewaxed oil solution ascends above this wax layer and is, therefore, recoverable in any suitable manner. The dewaxed oil layer and the wax layer behave as immiscible liquids having different specific gravities. The process of this invention, therefore, is conveniently practiced as a gravity settling process in which the removal of wax from the oil is accomplished inexpensively by the use of a suitable settling tank or wax fractionator. The term "urea" is intended herein to designate not only urea but substituted derivatives such as ethyl urea, diethyl and butyl urea, and thioureas.

In the low temperature settling of the wax by this process, an additional distinct advantage is provided in that various layers of wax fractions are produced, one on top of another within the overall wax layer, the waxes of which possess different melting points. In conventional dewaxing operations as practiced heretofore, the wax residue which is obtained constitutes a mixture of crystalline and amorphous wax bodies of varying molecular weight and melting point, and the separation of these components, one from another, is generally too expensive to be practiced commercially as a matter of course; the usual wax residue, therefore, is commonly either burned as fuel, charged to cracking plants, or sold as wax at a price which is dictated by its least desirable components. In contrast, the present invention provides hard wax, or wax of higher melting point and capable of commanding a premium price for that reason, separated or readily separable from soft wax, with the net result that the yield of wax products is upgraded appreciably.

It has been known that urea and related compounds having the general formula

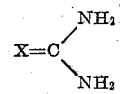

in which X may be either oxygen or sulphur, are capable of forming complex compounds with waxy constituents of mineral oil, and processes have been proposed in which this phenomenon is utilized as a means of effecting separation of wax from mineral oil bodies at relatively elevated temperatures in the range, for example, from room temperature to 125° F. or more. However, a large quantity of urea in proportion to the oil is required in such a process, and a large percentage of the urea used is either lost in the waxy residue or must be separately recovered from it if waste of the complexing agent is to be avoided. In such procedure, for example, about three to six times as much urea as there is wax in the oil is added to the oil while the oil is hot, in order to obtain the formation of a separable wax-urea complex. The wax residue which is obtained in the dewaxing by this method contains over 40% of urea.

In the practice of the present invention, only a fraction of the amount of urea previously required is needed to accomplish dewaxing. In general, for example, from approximately $\frac{1}{10}$ of 1% to approximately 5% of urea, based upon the weight of the entire body of oil, has been found to produce satisfactory results, and a suitable amount for a commercial operation, in which the oil to be dewaxed is chilled to approximately —20° to —40° F., is approximately 0.2 to 0.8% by weight of the oil.

The urea may be added to the oil either as a dry powder or in liquid solution. An aqueous solution of urea, substantially saturated, for example, is preferred, and a small percentage of an anti-freeze, such as methanol or calcium chloride, is used to prevent freezing of the water at the low temperature at which precipitation of wax from the oil is effected. In fact, it has been determined that the presence of water appears to augment the ability of the urea to induce the formation of large hydrous wax crystals from the oil, and this, at least in part, may account for the surprising efficacy of the small percentage of urea in yielding satisfactory dewaxing.

More specifically, in the preferred practice of the invention, oil and aqueous urea solution are brought into admixture and are allowed to remain in contact for a relatively short period of time, during which any excess of aqueous urea solution appears to be rejected by the oil and settles out as a liquid layer which is adapted to be recycled for reuse. This treatment, therefore, is utilized advantageously in advance of the chilling of the oil or the actual wax precipitation step. By this means, the presence of an unnecessary quantity of urea in the oil during actual dewaxing is avoided in a simple and convenient way. It is preferable to conduct this preliminary settling operation for the removal of any excessive amount of urea at a temperature which is lower than the temperature at which deasphalting of the oil, or mixing of the oil with diluent, is conducted, but higher than the temperature at which dewaxing is to be conducted. The precise temperature is not critical and a temperature of between approximately 50° F. and 110° F., for example 85° F., has been found to be satisfactory.

To insure suitable fluidity of the oil when it is chilled to low temperature for dewaxing, an inert diluent or solvent is employed. Diluents which we have found to be particularly suitable are liquified normally gaseous hydrocarbons such as propane, butane, or the like, or sulphur dioxide. Other solvents such as naphtha, benzol, toluene, or the like may also be employed, either alone, in admixture with each other, or in admixture with liquid normally gaseous diluent. It may be noted, however, that when normally liquid solvents, such as naphtha, benzol and toluene are used as diluents, the amount of urea required for dewaxing is somewhat greater than when liquified normally gaseous hydrocarbons are used, within the quantities previously stated. It is desirable that the diluent selected be capable of being volatilized ultimately from the dewaxed oil.

Utilization of the invention in a typical way is illustrated in the accompanying illustration which, by way of example, shows the dewaxing of an Eastern Kentucky oil stock:

The oil which is to be dewaxed, supplied through line 1, is admixed with propane, supplied as make-up or recycle stock through line 2, and is then passed through a steam heater 3 in which the temperature of the mixture is elevated to approximately 150 to 175° F. The heated charge is next passed to a wax solution tower 4. A pressure of approximately 375 to 400 lbs. per square inch, i. e., above the critical pressure of the normally gaseous diluent, if such is utilized, is maintained in this part of the equipment. Since liquid propane acts as a selective solvent, asphalt which may be present in the cylinder stock may settle in the tower 4 and may be removed therefrom by a bottom drain 5. The deasphalting step, as well as elevation of the oil to a temperature of 175° F., is not essential to the practice of the present invention and is illustrated only to describe typical operation.

An aqueous solution of urea, either as a fresh make-up solution or as a recycle solution, produced as subsequently described, is brought into contact, through line 6, with the oil-diluent admixture flowing through line 7 from the top outlet of the wax solution tower. These two streams pass through line 8 to a urea mixer 9 where the components are brought into intimate contact with one another. The stream is next passed through a water cooler 10 into the urea settler 11. The water cooler reduces the temperature of the stream to approximately 50° F. to 110° F., and pressure is lowered to approximately 250 to 300 lbs. Alternatively, urea mixer 9 may be located in the circuit at the outlet side of water cooler 10, that is, between the water cooler and urea settler 11.

The amount of diluent which is added to the oil may be in the ratio of approximately 10 to 1; for example, in the dewaxing of approximately 1,000 barrels per day of cylinder stock, about 10,000 barrels of hydrocarbon diluent may be used comprising approximately 72% propane, 20% butane, and 8% propylene. The amount of diluent is not critical and may be varied considerably from the ratio given in accordance with variations in the nature of the stock being dewaxed, dewaxing temperature, and the degree to which wax is to be removed from the oil. In general, a high ratio of diluent to oil will improve the rapidity of settling and the degree of wax removal but only at a greater expense in the cost of recovering diluent from the oil and wax fractions after dewaxing.

For urea addition, a saturated solution thereof may be used as make-up, along with 10 to 30% by weight of anti-freeze, the amount of the latter being proportioned merely to prevent freezing in the subsequent dewaxing operation of the water by which the urea is added to the oil. The system shown in the accompanying illustration contemplates the use of methanol as the anti-freeze. However, it is to be noted that the system has been operated satisfactorily without the use of alcohol or other anti-freeze, and that this agent, when employed, serves merely a protective function.

In the urea settler 11, urea, water and anti-freeze (if present) are absorbed by the oil, but any excess of urea solution which the oil does not absorb settles at the bottom of the tower 11 and may be withdrawn through line 12 for recycling to the urea mixer through the line 6. The withdrawn solution will, of course, contain any anti-freeze which is dissolved in it. This recycling feature provides an important advantage in the practice of the invention, since it simplifies control of operation and eliminates urea wastage.

A stream of diluted oil containing absorbed area, water and anti-freeze is drawn from the top of the urea settler through line 13, whence it passes through a cold heat exchanger 14, by means of which the temperature of the stream is reduced to approximately 0 to 25° F. After such chilling, the stream is then passed, through line 15, to an evaporator 16. Feed stock entering the evaporator may be at a pressure of approximately 125 to 175 lbs. per square inch, but within the evaporator, the pressure is released down to approximately 1 to 10 lbs. per square inch, for autogenous refrigeration of the stock to a temperature, for example, of −20 to −30° F. Any other suitable refrigerating system may be utilized in place of the autogenous system just described, but the latter is preferred because of the heat economies which it provides. The temperature to which the oil is chilled is preferably as low as possible, being consistent with the economics of refrigeration. The chilled oil passes from the evaporator through line 17, through primary and secondary wax settlers 18 and 19, which are connected in series by line 20, and dewaxed oil is removed from the top of the secondary wax settler 19 through the line 21. This oil is passed to a recovery system for the removal of diluent therefrom, as described at a later part in the specification. The dewaxed oil at this stage contains diluent but is free, or substantially free, from wax and urea.

Primary wax from the settler 18 and secondary wax from the settler 19 are removed through lines 22 and 23, respectively, to a conduit 24 which leads to vertical wax settler 25. This settler is in the form of a tower having a transverse baffle 26 approximately at its mid height with a chimney 27 in the baffle to permit upflow of liquid. The wax is charged into the vertical settler at a point below the baffle, and the settler enables wax to separate from entrained oil.

Within the settler, soft wax having a melting point of approximately 105° F. collects above the baffle 26, while hard wax having a melting point of approximately 130° F., for example, collects in the bottom part. These waxes are withdrawn separately through soft wax line 28 and hard wax line 29, for treatment thereof in a separate recovery system to remove the diluent and oil which they contain. Separate recovery systems may be used for the treatment of the respective hard and soft wax fractions, or, if wax quality is unimportant, the waxes may be admixed for processing in a single recovery system. As a still further alternative, the soft and hard wax yields may be processed alternately in a single recovery system to which wax is fed through line 30. Such an arrangement is contemplated in the system shown in the drawing.

Oil which separates from the wax fractions in the vertical settler 25 is removed through the top outlet 31. This oil is wax-free and may, if desired, be admixed with dewaxed oil passing through line 21 from the secondary wax settler 19. However, the yield of dewaxed oil from the vertical settler is relatively small, and, in order to prevent any possible recontamination of the main end product stream with wax-bearing oil in the event that the operating controls are imperfect, it is preferred to merely recycle the dewaxed oil from the vertical wax settler back to the evaporator, as through line 32.

It has been determined that the addition of diluent to the wax residues produced in the primary and secondary settlers, prior to their introduction into the vertical wax settler, facilitates the separation of entrained oil from the settled wax fractions in the vertical wax separator, and, therefore, provision is made to admit diluent to the line 24 through the line 33 in advance of the vertical wax settler. An amount of diluent, for example, propane, is admitted which yields a ratio of approximately 6 to 7 parts of propane to each part of wax.

Removal of diluent from dewaxed oil

Dewaxed oil liberated in the secondary wax settler 19, and passing through line 21, is utilized as the refrigerant in the chiller 14 to cool the feed stream passing to the evaporator 16. After passing through the chiller 14, the mixture of oil and diluent is passed to a steam heater 35 at which some of the normally gaseous diluent is stripped from the oil, the diluent passing off through line 36 and the oil through line 37. The oil is next passed through a water cooler 38, thence through a heat exchanger 39 to an acid treating tank 40 where fresh acid may be admixed with the oil for decolorization in accordance with conventional practice. The oil next passes through successive steam heaters 41 and 42 where further percentages of diluent are removed, thence to a vacuum steam stripper 43 where final traces of diluent are liberated. The stripping of a diluent from oil is well understood by those who are skilled in the art, and, therefore, a detailed description of the system in this respect need not be stated.

Finished oil is taken from the vacuum steam stripper through line 44, passed through a water cooler 45, and then constitutes the finished dewaxed oil product.

Diluent recovery

The diluent which is liberated as a gas at the evaporator 16 in effecting auto-refrigeration of the oil for dewaxing thereof is conducted through line 46 to a heat exchanger 47, thence to a compressor 48. The compressor discharge is conducted through line 50 to a water condenser 51 which discharges to a diluent liquid receiver 52. Water, ammonia, and other contaminants settling out in the receiver are removed through a drain line 53, and liquid diluent collected in the receiver is recycled through line 54 to the main diluent feed line 2. Make-up of diluent, as required in continuous operation of the system, may also be added at this point. Diluent liberated at the respective steam heaters 35, 41, 42, and vacuum steam stripper 43 may also be connected to the propane receiver 52 in the circuit in the drawing.

Wax recovery system

The wax precipitates recovered in the vertical wax settler may comprise approximately 0.8 to 5.1% of urea, approximately 0.3 to 3.2% of water, and approximately 0.3 to 2.3% of anti-freeze, along with entrained oil and diluent. Wax, as discharged through line 30, is passed first through a heat exchanger 39, thence through line 56 to a steam heater 57, and water is injected into the wax stream ahead of the steam heater. The addition of a small percentage of water at this point (for example, 5 to 15%) causes the urea to become dissolved therein whereby it may be separated from the wax fraction. The steam heater discharges through line 58 to a urea settler 59 at which urea solution and anti-freeze settle from the wax fraction. These components are now removed, through line 60, to an alcohol stripper 61 which discharges through a vapor line 62 to a water condenser 63. The alcohol condensate is collected in an alcohol receiver 64 which discharges to an alcohol recycle line 65.

The solution of urea in water is removed from the alcohol stripper by means of a pump 66, and is passed to a urea concentrator 67, wherein water is evaporated from the urea solution. A concentrated solution of urea is thus produced, which is recycled through line 68 for reuse in the system along with the alcohol solution which is provided in line 65. As an alternative, the concentrator may be omitted and dry urea may be added as a portion of the urea make-up solution produced at the alcohol stripper and recycle urea settler 11, to bring it up to suitable strength for reuse, while the remainder of the solution is discarded. It may be noted in this respect that the quantity of urea required to effect dewaxing is so small that the cost of concentrating equipment is not justified except in installations of substantial capacity.

At the urea settler 59, a top flow of diluent and wax is released through line 70. This stream is conducted to a steam heater 71, thence through line 72 to a flash tower 73. Diluent vapor is liberated at the flash tower and is removed through line 74 which may be interconnected with the propane recovery system previously described, as by admixture with the diluent vapor liberated in the oil stream steam heater 42 or in another suitable manner.

The wax remaining in the flash tower 73 is removed through a line 75 to a steam heater 76, and is then passed to a wax vacuum steam stripper 77 at which the final traces of diluent are removed therefrom. The diluent liberated in this stripper may be mixed with the diluent liberated at the dewaxed oil steam stripper 43 for redelivery to the diluent recovery system through the vacuum pump 78.

The wax produced in the wax vacuum steam stripper 77 is taken to storage. As previously described, the wax recovery system may be operated alternately on hard wax, then on soft wax, or separate wax recovery systems may be utilized for the respective types of waxes if desired.

The following data illustrates the yield of end products and their characteristics in a system of the type just described operated upon Eastern Kentucky cylinder oil stock:

|  | Cylinder Stock Charge | Dewaxed Oil From Settlers | Acid Treated Dewaxed Oil | Wax to Storage |
|---|---|---|---|---|
| Color, NPA (Straight) | Olive Green. | −8 | 5 | Olive Green. |
| Color, NPA (95/5 Dilution) | 4 | 3 |  | 3.5 |
| Conradson Carbon, Wt. percent | 2.5 | 2.1 | 1.75 | 2.3 |
| Flash, COC, deg. F | 560 | 555 | 555 | 550 |
| Fire, COC, deg. F | 630 | 630 | 630 | 620 |
| Gravity, deg. API | 22.0 | 21.9 | 22.5 | 22.7 |
| Pour Point, deg. F | +55 | +10 | +15 | +110 |
| Viscosity at 100° F. S. U |  | 5107 | 4617 |  |
| Viscosity at 210° F. S. U | 190.0 | 195.0 | 188 | 182 |
| Viscosity Index | +78 | +75 | +78 | +87 |
| Yield, Percent by Volume | 100 | 82.5 | 77.5 | 17.5 |

Those skilled in the art readily will comprehend the various ways in which different types of systems for recovery of diluent and urea may be utilized in the practice of the principles of the invention which have been described. In the process shown, solutions which are pumpable prevail at all processing stages. While urea preferably is used in the form of an aqueous solution, the presence of water is not essential to the practice of the process, and urea may be fed to the oil in the form of a dry powder if desired, though in somewhat greater quantity within the ranges indicated. Also, even when water is used as the urea solvent, it is not essential to employ an anti-freeze agent since the quantity of water is small and ice does not prevent operation of the apparatus even it it is allowed to form.

Having described my invention, I claim:

1. The method of dewaxing a wax-bearing cylinder oil stock, which method comprises, admixing an inert solvent with the oil to dilute the same, then adding to said admixture an aqueous solution of urea sufficient in amount to include therein approximately 1/10 of 1% to 5% of urea, based upon the oil weight, settling the admixture of oil, inert solvent, and aqueous urea solution to separate therefrom aqueous urea solution which the admixture is unable to absorb, removing such excess, then chilling the supernatant oil solution containing absorbed aqueous urea solution to a temperature of approximately −20 to −40° F., thereby inducing the formation of a hydrous waxy precipitate from the oil, and settling the oil to provide stratification of a wax-bearing layer and a dewaxed oil layer, separating the dewaxed oil layer from the wax layer, and removing diluent from the dewaxed oil.

2. The method of dewaxing a wax-bearing cylinder oil stock, which method comprises, admixing an inert solvent with the oil to dilute the same, then adding an aqueous solution of urea to the diluted oil in amount sufficient to provide therein approximately 0.2 to 0.8% of urea, based on the oil weight, settling the diluted oil aqueous urea admixture at a temperature of between 50° F. and 110° F. to permit separation therefrom of aqueous urea solution which the oil does not absorb, removing the separated excess of aqueous urea solution then chilling the diluted oil containing absorbed aqueous urea solution to a temperature of approximately −20 to −40° F., thereby causing the formation of a wax-bearing precipitate in the diluted oil, next settling the diluted oil to permit stratification of a wax-bearing layer from dewaxed diluted oil, and removing the dewaxed diluted oil from the wax-bearing layer.

3. The method of treating a wax-bearing petroleum oil to dewax the same, which method comprises, mixing the oil with a normally gaseous liquified diluent, adding to the diluted oil from about 1/10 of 1% to 5% of urea in aqueous solution, based on oil weight, settling the admixture of oil and diluent containing said added aqueous urea solution to separate therefrom aqueous urea solution which the diluted oil is unable to absorb, removing such excess, then chilling the diluted oil containing absorbed aqueous urea solution to a temperature which is below the solidification temperature of a urea-wax complex and thereby effecting the precipitation of wax from the oil, then causing the wax complex to settle from the oil and stratify into a soft wax layer and a hard wax layer.

4. The process of dewaxing a wax-bearing mineral oil, which process comprises, diluting the oil with an inert liquid solvent, adding to the diluted oil 0.2 to 0.8% of urea in aqueous solution, based on oil weight which amount of urea is greater than the diluted oil is capable of absorbing, settling the admixture of diluted oil and aqueous urea solution and thereby separating from the diluted oil the aqueous urea solution which the oil does not absorb, recycling the separated aqueous urea solution into admixture with oil to be dewaxed, and chilling that oil which contains absorbed aqueous urea solution to a temperature sufficiently low to effect precipitation of wax from the oil, then separating the precipitated wax from the oil, thereby producing dewaxed oil.

5. The method of dewaxing a wax-bearing lubricating oil stock, which method comprises admixing an inert solvent with the oil to dilute the same, then adding to the said admixture an aqueous solution of urea sufficient in amount to include therein approximately 0.2 to 0.8% of urea based on the oil weight, settling the admixture of oil inert solvent and aqueous urea solution to separate therefrom aqueous urea solution which the admixture is unable to absorb, removing such excess, then chilling the supernatant oil solution containing absorbed aqueous urea solution to a temperature of approximately −20 to −40 F., thereby inducing the formation of a hydrous waxy precipitate in the oil and settling the oil to provide stratification of a wax-bearing layer and a dewaxed oil layer, separating the dewaxed oil layer from the wax layer and removing the diluent from the dewaxed oil.

6. The method of treating a wax-bearing petroleum oil to dewax the same, the method which comprises, mixing the oil with a normally gaseous liquified diluent, adding to the diluted oil from about 0.2 to 0.8% of urea in aqueous solution, the amount of urea being based on the oil weight, chilling the diluted oil to a temperature which is below the solidification temperature of a urea-wax complex formed in the oil and thereby effecting precipitation of wax from the oil, then causing the urea-wax complex to settle from the oil and stratify into a soft wax layer and a hard wax layer.

7. The method of dewaxing a wax-bearing mineral oil, which method comprises, admixing an inert solvent with the oil to dilute the same, then adding to said admixture an aqueous solution of urea sufficient in amount to include therein approximately 0.1 to 5% of urea based on the oil weight, settling the admixture of oil inert solvent and aqueous urea solution at a temperature of between approximately 50° to 110° F. to permit separation therefrom of aqueous urea solution which the oil is unable to absorb, removing such excess, then chilling the oil containing absorbed aqueous urea solution to a temperature of approximately −20° to −40° F., thereby inducing the formation of a waxy precipitate in the oil, settling the oil to provide stratification of a wax-bearing layer and a dewaxed oil layer, separating the dewaxed oil layer from the wax layer and removing the diluent from the dewaxed oil.

References Cited in the file of this patent

UNITED STATES PATENTS

| | | |
|---|---|---|
| 1,933,868 | Mitchell-Roberts | Nov. 7, 1933 |
| 2,031,095 | Bray | Feb. 18, 1936 |
| 2,160,930 | Whiteley et al. | June 6, 1939 |
| 2,229,659 | Carr | Jan. 28, 1941 |
| 2,499,820 | Fetterly | Mar. 7, 1950 |
| 2,560,193 | Shoemaker | July 10, 1951 |
| 2,653,123 | Kirsch et al. | Sept. 22, 1953 |
| 2,723,220 | Axe | Nov. 8, 1955 |